United States Patent [19]
Rossi

[11] Patent Number: 4,506,455
[45] Date of Patent: Mar. 26, 1985

[54] LOADING EQUIPMENT FOR LYOPHILIZATION APPARATUS

[75] Inventor: Gianrico Rossi, Pavia, Italy

[73] Assignee: Edwards Alto Vuoto S.p.A., Milan, Italy

[21] Appl. No.: 503,225

[22] Filed: Jun. 10, 1983

[30] Foreign Application Priority Data

Jun. 18, 1982 [IT] Italy .................................. 2219482[U]

[51] Int. Cl.³ .......................... F27D 3/12; F26B 19/00
[52] U.S. Cl. ......................................... 34/5; 432/125; 414/331; 211/187; 34/194; 422/104
[58] Field of Search ........................ 422/104; 34/5, 92; 432/125; 414/331, 787; 211/187, 130, 149, 201; 108/91

[56] References Cited

U.S. PATENT DOCUMENTS

| 3,184,862 | 5/1965 | Frank | 34/92 |
| 3,448,556 | 6/1969 | Taggart | 34/92 |
| 4,396,338 | 8/1983 | Applegate et al. | 414/331 |

Primary Examiner—Michael S. Marcus
Assistant Examiner—Joseph P. Carrier
Attorney, Agent, or Firm—Collard, Roe & Galgano

[57] ABSTRACT

The equipment comprises in a lyophilization autoclave an auxiliary inspection door formed in the lower region of the lyophilization chamber main door and effective to allow full view of, and access to, the product carrying plate pack at the bottom of the chamber, and a substantially carriage formed loading platform provided at the inspection door effective to support thereon trays of the product to be lyophilized and guided and positioned in such a way as to remain at a constant height level substantially corresponding to the height level of the uppermost plate in the lower pack.

4 Claims, 5 Drawing Figures

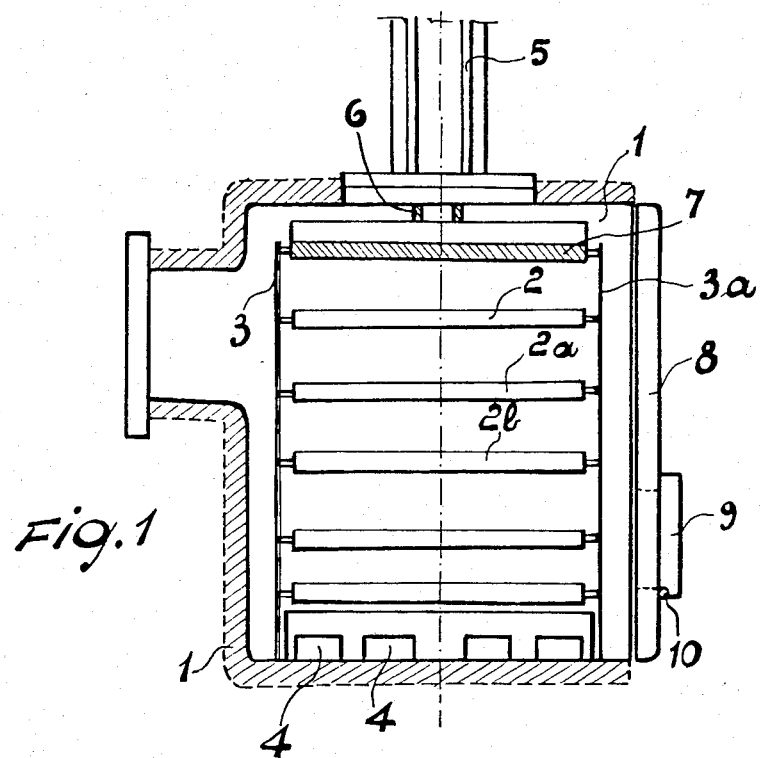
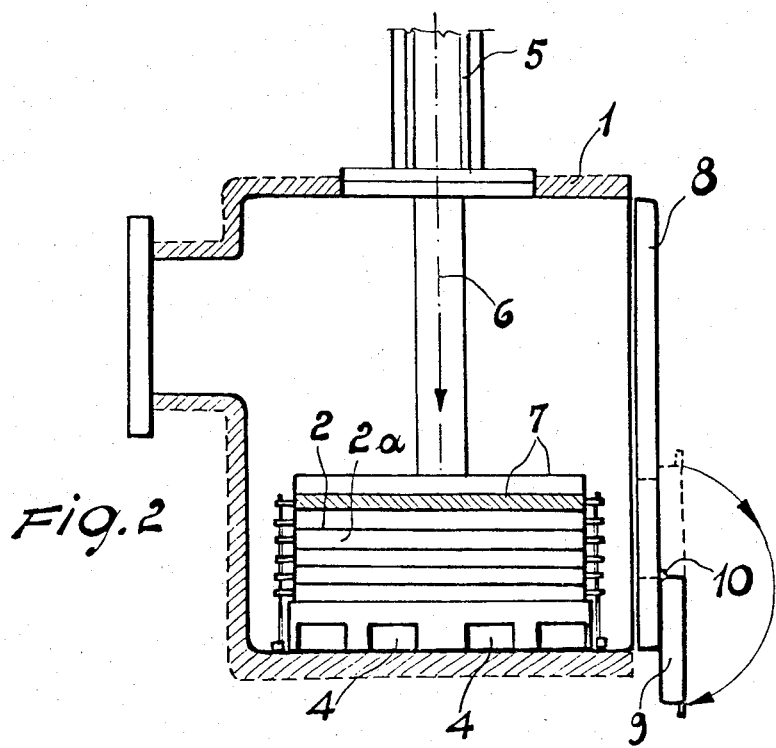

LOADING EQUIPMENT FOR LYOPHILIZATION APPARATUS

BACKGROUND OF THE INVENTION

This invention relates to an equipment for loading at a high regular rate the product carrier plates in a lyophilization chamber through the use of containers prearranged externally and positioned at a constant and convenient height level for the operator.

It is known that in lyophilization systems handling products or substances contained within flacons or the like, of the type having a collapsible rack of product carrier plates which are interconnected by flexible links adapted to permit their contracting into a pack at the bottom of the chamber, one of the most difficult problems to solve is that of reducing downtime during the loading step. A further difficult problem awaiting a solution was that of preventing condensation of steam over the product carrier plates, also during the loading step of the system; in fact, in the instance of unstable products to be lyophilized on pre-cooled plates, one of the main drawbacks encountered is condensation on the interior of the lyophilization chamber of considerable amounts of steam, both as drawn in from the outside and as condensed over the cold surfaces of the chamber interior parts, since during the loading operation outside air enters the lyophilization chamber through the open door and the longer the loading time, the greater the quantity of exchange of air moisture.

SUMMARY OF THE INVENTION

It is a primary object of this invention to provide an equipment for loading the product carrier plates of lyophilization chambers, which is so constructed and dimensioned as to bring about a drastic reduction of the downtime involved by the loading step, while at the same time effective to highly reduce the formation of condensate within the chamber and particularly over the cold surfaces of the product carrier plates, to avoid highly unstable products to be affected thereby.

A further object of the invention is to provide an equipment for loading at a high regular rate said product carrier plates, which can be useful with conventional lyophilization systems without requiring any significant alterations thereof, and above all, has minimal space requirements, is highly practical, and quite reliable.

According to one aspect of the invention these and other objects, such as will be apparent from the detailed description which follows, are achieved by a loading equipment in combination with a lyophilization autoclave, wherein the autoclave comprises a lyophilization chamber with a door and a bottom and within the lyophilization chamber a rack of supporting plates for containers containing a substance to be subjected to lyophilization, said rack of plates being of collapsible type adapted to be contracted into a compact pack setting and adapted to be expanded into an expanded setting in which the plates are arranged at a preestablished vertical distance from one another sufficient for placing said containers therebetween, the autoclave further comprising an actuator for controlling the setting of said plate rack, characterized in that said equipment comprises platform means outside said autoclave, on which containers to be introduced into said lyophilization chamber are placed, said platform means defining a loading level for the lyophilization chamber and in that said autoclave has a closable port at said loading level, said port defining a passage for said containers to be loaded, the height of said passage being at least as great as said preestablished vertical distance between said plates.

Advantageously, the closable port is in the form of an inspection door which is of the downward tilting type, and the platform means are in the form of a carriage, which is guided axially toward the aperture of the inspection door and hookable to the exterior of the lyophilization chamber door.

It will be understood that with the equipment of this invention during the loading time entrance of outside air into the lyophilization chamber is highly reduced owing to the small size of the port and owing to the reduced loading time.

BRIEF DESCRIPTION OF THE DRAWINGS

Further constructional features of the equipment according to this invention will be made clear in the following detailed description, with reference to the accompanying illustrative drawings, where:

FIG. 1 is a vertical midsection view of a lyophilization chamber with the collapsible rack of product carrier plates which are shown in expanded condition spaced apart from each other and connected to an actuating cylinder-piston assembly, as suitable for cooperation with the inventive loading equipment;

FIG. 2 shows the same chamber as FIG. 1, but with the product carrier plates contracted into a pack at the bottom of the chamber;

DESCRIPTION OF THE PREFERRED EMBODIMENTS

Figure 3:
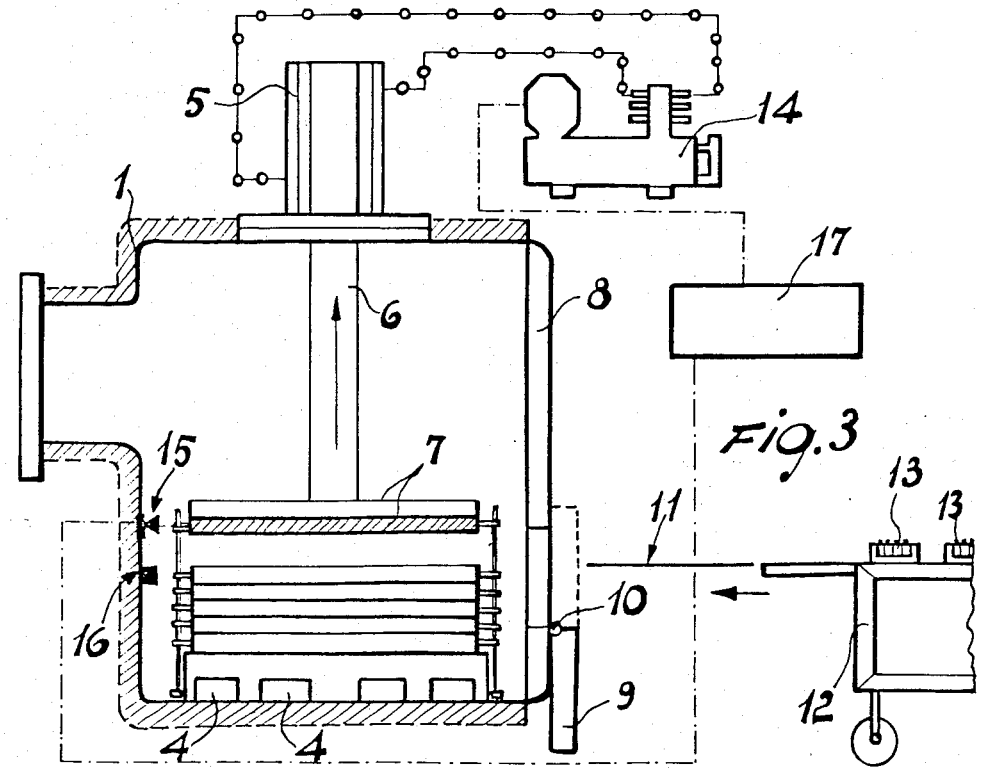
FIG. 3 shows the chamber of the preceding Figures with the open port or inspection door, loading platform and movable carriage forming together the loading equipment of this invention.

With reference to the drawing figures, the loading equipment according to this invention is shown as applied to a lyophilization chamber 1 of a type which contains a collapsible rack of product carrier plates 2, 2a, 2b, etc., supported together by flexible or telescoping links 3–3a, and accordingly, such that they can be contracted into a pack (FIG. 2) at the bottom of the chamber resting on bottom supports 4. The individual plates 2–2a, etc., can be raised (and lowered) through a hydraulic cylinder-piston assembly 5, whose rod 6 is connected to the first plate 2 via a compensation or buffer plate 7. The chamber 1 is normally provided with a full height or main door 8 to permit, in conformity with conventional practice, the plate rack to be inserted and the carrying out of internal servicing operations.

This type of otherwise conventional chamber incorporates the loading equipment of this invention, which comprises the provision of an auxiliary closable port or inspection door 9, formed in the lower region of the door 8 and hingedly connected along its bottom side 10 such that it can be tilted downwards; the inspection door location and dimensions are selected such as to allow a full view of, and accordingly access to, the contracted plate pack when positioned at the bottom of the chamber (FIG. 2). In order to reduce to a minimum the exchange of outside air during the loading operation, the height of the passage defined by the port may be of the same dimension as the vertical distance between the plates of the collapsible rack, when in expanded condition.

At a location facing said open inspection door 9, there is provided a loading platform, generally indicated at 11 in FIG. 3, set at a fixed height level, and specifically, at a height level which corresponds to that of the first plate 2 in the contracted pack of plates piled up at the bottom. Said loading platform 11 is supported partially cantileverwise by a carriage assembly 12, which is guided at its bottom portion and can be hooked onto the outer wall surface of the door 8, its top surface being dimensioned to accommodate a group of trays or containers 13 filled with small flacons containing products to be lyophilized and whose overall area corresponds to the useful area of each product carrier plate. Thus, each plate can be loaded (as will be explained hereinafter) by manually moving the whole carriage load onto a plate raised to the level of the carriage flat surface. Spacer formations (not shown) on the trays maintain the desired distance between the trays.

Also in accordance with this invention, there is provided an actuator for moving the individual plates, which provides for raising and stopping level with the loading plane 11 each plate in the pack for a sufficient time period to enable the plate to be loaded. The actuator comprises the cylinder-piston assembly 5, as controlled through a hydraulic unit 14, and position sensors 15 associated, in a conventional manner, with a photocell switch or the like 16; the latter is in turn connected to a pulse processing electric unit 17 operative to intermittently bring into play said hydraulic unit, thereby enabling the raising and stopping of each plate of the lower pack portion to a position ready for loading.

Figure 4:
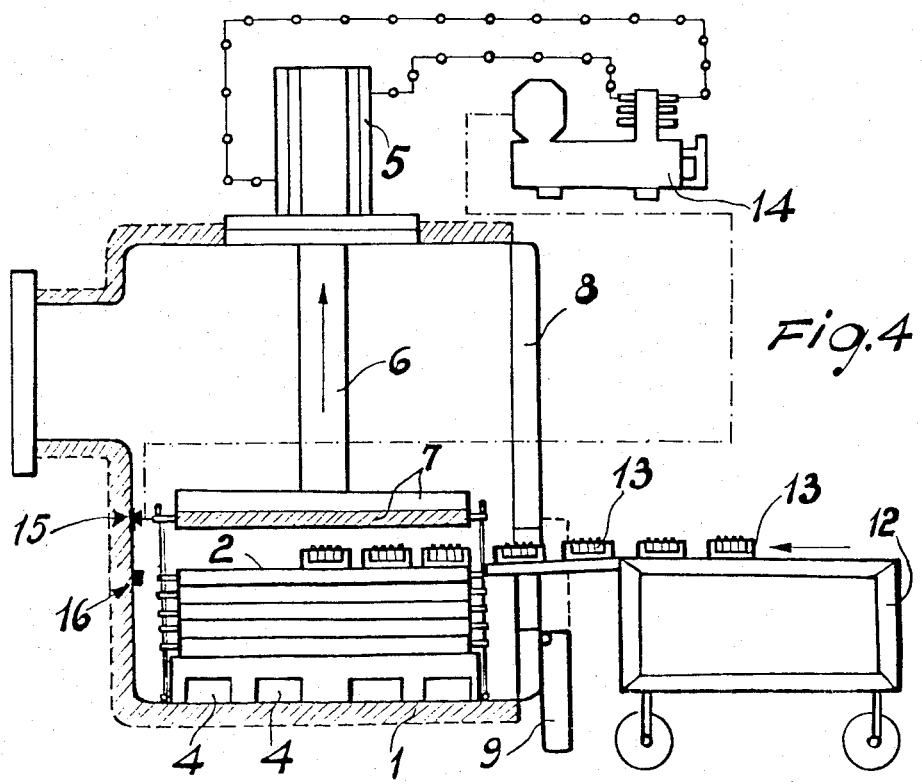
FIG. 4 is similar to FIG. 3 but showing the uppermost or first supporting plate of the contracted pack at the chamber bottom while being loaded.
Figure 5:
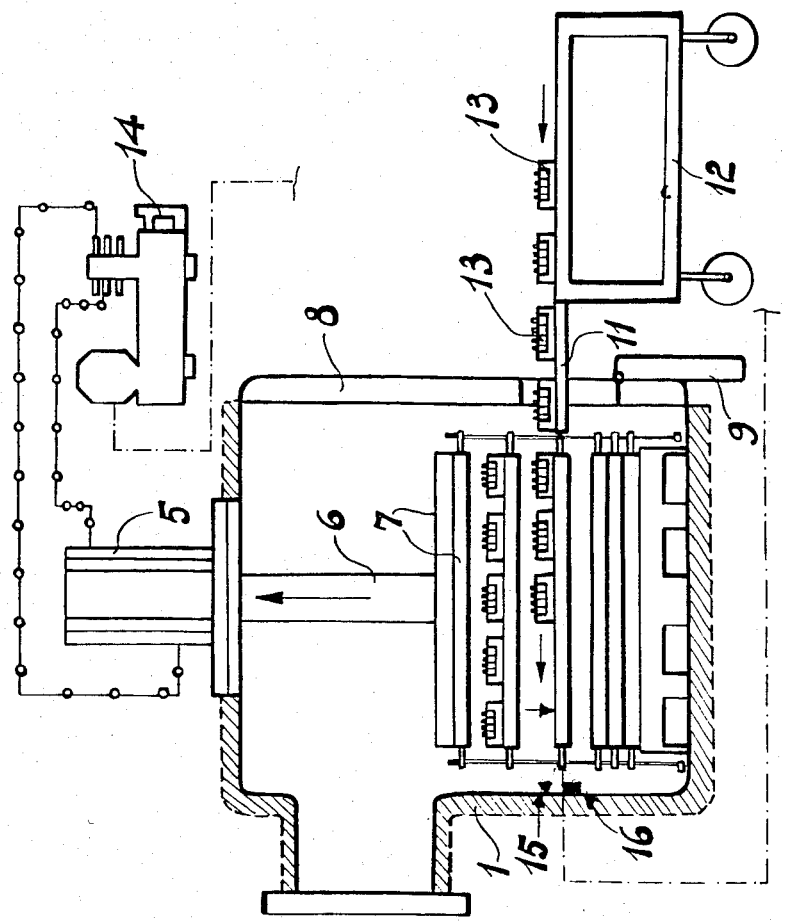
FIG. 5 is a similar view to FIG. 4, but illustrating the loading step of the second plate of the rack with the underlying contracted pack portion.

Illustrated in FIG. 4 is the loading step of the first plate 2, i.e. the first plate in the pack, with the compensation plate 7 being held raised by the rod 6 of the upper piston 5, while FIG. 5 illustrates the loading step of the second plate 2a, as brought up level with the carriage flat surface, into a position spaced apart from the first plate, previously loaded and raised, by a distance equal to the length of the links which connect it to the contiguous plates, that is, by a sufficient amount to allow the trays 13 to be loaded.

The loading equipment described above is used in the following way. After the plates have been set into the collapsed lower pack configuration and opening the auxiliary inspection door, the carriage is positioned such that its loading platform is contiguous to and level with the first uppermost plate below the buffer plate 7 when the plate rack is contracted into a pack at the chamber bottom; then, the buffer plate 7 is raised by said piston rod 6, through said hydraulic unit, until sufficient clearance for loading is achieved between it and the first plate. The trays with the product are placed on the carriage platform 11 in a suitable number to cover the area of the loading plate, and then transferred manually as a whole onto the product carrier plate. Through said raising and stopping means, the plates are next raised such that the second plate in the pack (FIG. 5) is brought up to the loading height level and stably held there; thereafter, a further batch of trays are pushed from the carriage onto said plate. These operations are then repeated for the other plates, until the lyophilizer loading is completed. Finally, the inspection door 9 is closed and, after removing the carriage, the lyophilization cycle is initiated.

Of course, that same sequence of plate loading steps may be repeated in the reverse order to enable the individual plates to be unloaded upon completion of the lyophilization cycle; for this purpose, it will be sufficient to employ trays hookable to each other, such as to allow withdrawal of the tray batch and their positioning onto the carriage, whence the trays are then removed.

In practicing the invention, as is obvious, construction—and functionwise equivalent modifications and variations may be introduced with respect to the foregoing description, without departing from the scope of the invention.

I claim:

1. Loading equipment in combination with a lyophilization autoclave, wherein the autoclave comprises a lyophilization chamber with a full height door and a bottom and within the lyophilization chamber a rack of supporting plates for containers containing a substance to be subjected to lyophilization, said rack of plates, which rests on the bottom of the chamber, comprises a plurality of superimposed plates connected to one another by a plurality of adjustable support means, said adjustable support means permitting said rack of plates to be vertically collapsible and adapted to be contracted into a compact pack setting and adapted to be expanded into an expanded setting in which the plates are arranged at a predetermined vertical distance from one another sufficient for placing said containers therebetween, the autoclave further comprising an actuator for controlling the setting of said plate rack, said loading equipment comprising an auxiliary inspection port formed in the lower region of said full height door and effective to allow full view of, and access to, said plate rack, said loading equipment further comprising, separate from the autoclave, platform means including a loading carriage, which is manually provided near said port in a removably associable manner and guided and positioned so as to remain at a constant height level substantially corresponding to said loading level coinciding with the level of the first uppermost supporting plate in the plate rack, said loading carriage being effective to support thereon containers for products to be lyophilized in such a number and size as to correspond to the useful area of a carrier plate, said containers being manually transferable onto said plates as the latter are sequentially raised to the height level of said fixed loading platform, and held here for the time required to load, through a plurality of position sensors operatively coupled to a control unit for controlling said actuator.

2. The equipment according to claim 1, wherein said inspection port is of the downward swinging type, and said carriage is guided axially toward said inspection port and removably coupled to the exterior of the lyophilization chamber.

3. The equipment according to claim 1, wherein said sensors for sensing the position and alignment of the plates comprise at least one photoelectric cell switch and respective travel limit sensor.

4. The equipment according to claim 1, wherein said containers in one loading batch are removably coupled together so as to permit withdrawal thereof as a whole from the lyophilizer interior and displacement thereof onto said carriage upon completion of product treatment within the lyophilization chamber.

* * * * *